March 14, 1967 J. H. DONEEN 3,309,102
STABILIZING WHEEL APPARATUS
Filed May 12, 1965 2 Sheets-Sheet 1
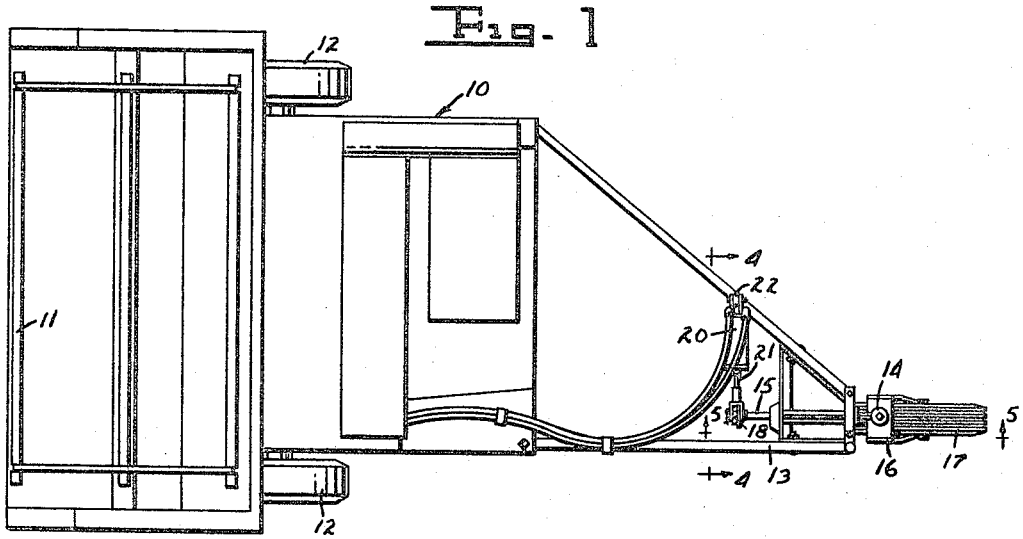
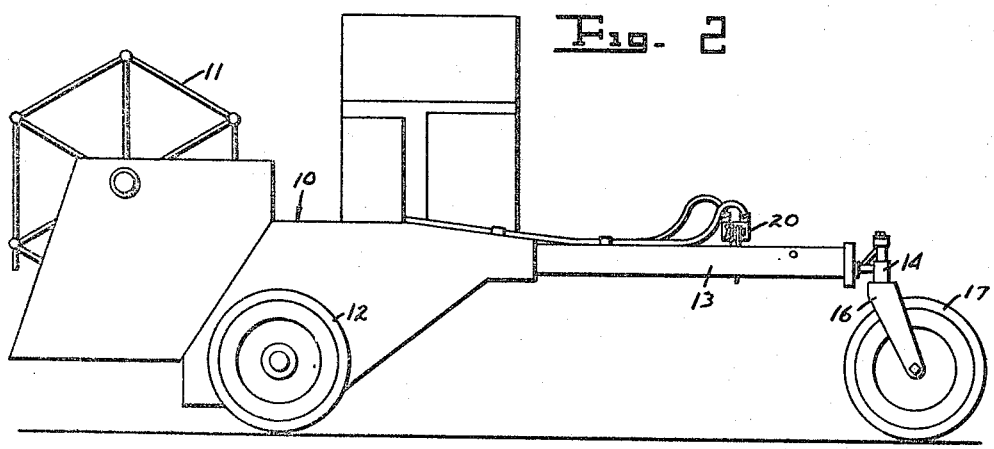
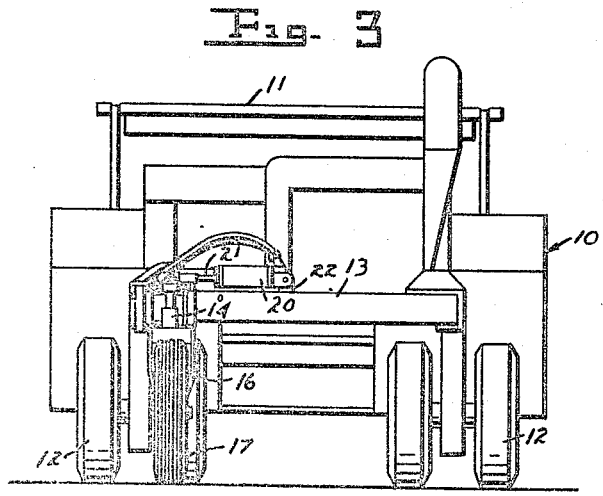
INVENTOR.
JOHN H. DONEEN
BY
ATTYS.

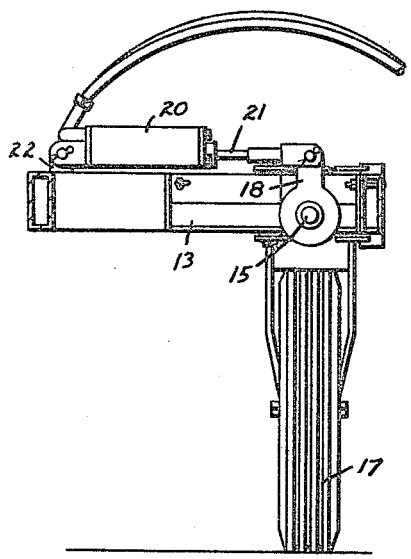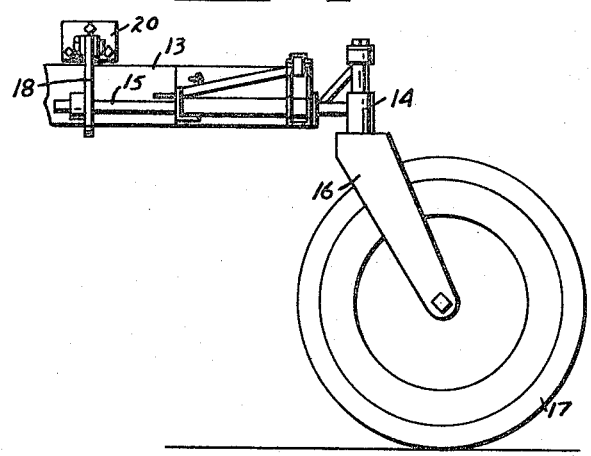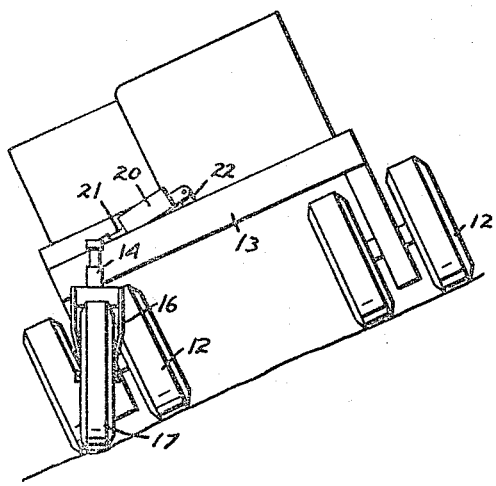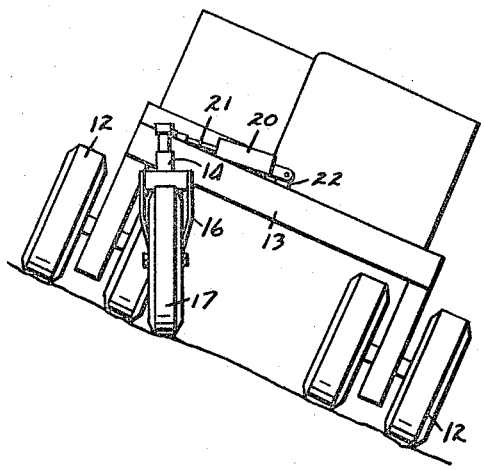

United States Patent Office 3,309,102
Patented Mar. 14, 1967

3,309,102
STABILIZING WHEEL APPARATUS
John H. Doneen, Farmington, Wash. 99128
Filed May 12, 1965, Ser. No. 455,093
3 Claims. (Cl. 230—80)

This invention relates to a novel stabilizing wheel apparatus designed particularly for farm machines and implements.

The use of farm implements and machines on hillside surfaces is typically a very difficult task. Most farm machinery is constructed for use on relatively level fields and have a tendency to slide downhill when used on a hillside slope. To correct this, the operator of the machine must constantly attempt to steer the machine uphill. This detracts from the accuracy of his path and requires concentration and attention which could otherwise be directed to the crop and the operations being conducted by the machinery. The present device is a simple attachment for existing farm machines of this type, adapted to assist the operator of the machine in holding a straight and consistent path along a hillside slope.

It is a first object of this invention to provide a simple stabilizing wheel assembly adapted to take the place of the conventional upright trailing wheel at the rear of a machine, designed to accommodate the machine to hillside slopes.

Another object of this invention is to provide such an attachment that in no way detracts from the normal operation of the machine and which can be readily mounted on any existing apparatus.

Another object of this invention is to provide such an assembly that is completely under the control of the operator so that he can readily adjust the assembly to the conditions encountered by the machine.

These and further objects will be evident from a study of the following disclosure, taken together with the accompanying drawings, the drawings illustrating one example of a machine provided with such an attachment. It is to be understood that this form of the invention is only by way of example, and that minor modifications can be made without deviating from the basic concept of the invention.

In the drawings:

FIGURE 1 is a top view of a farm machine provided with the instant invention;

FIGURE 2 is a side elevation view of the machine shown in FIGURE 1;

FIGURE 3 is a rear elevation view of the machine shown in FIGURE 1;

FIGURE 4 is an enlarged fragmentary sectional view of the present attachment as seen along line 4—4 in FIGURE 1;

FIGURE 5 is an enlarged fragmentary sectional view of the attachment as seen along line 5—5 in FIGURE 1;

FIGURE 6 is a simplified rear view of the machine and attachment when operating on the hillside slope; and FIGURE 7 is a view similar to FIGURE 6, showing the machine on an oppositely directed hillside slope.

In some areas, it is advantageous or necessary to carry out farming operations on hillside slopes. In certain areas of the country, such farm operations are the rule, rather than the exception.

The general features of the machine adapted for such hillside use are shown in the drawings. The drawings illustrate the basic portions of a swather, used to cut crops such as peas and to lay the crop on the ground in a long swath or row. If used as manufactured, with three supporting parallel vertical wheels, this type of machine tends to drift downhill.

As shown in the drawings, the swather, generally designated by the numeral 10, includes a forward reel 11, beneath which is mounted a conventional sickle bar or other cutting assembly. No particular details of this machinery are believed to be necessary in order to understand the instant invention. The swather 10 is carried by two independently driven front wheels 12. Steering of the apparatus is accomplished by varying the relative speed of the respective wheels 12. The rear of the machine is supported conventionally by an upright trailing wheel. It is the structure of the wheel attachment substituted in place of this conventional wheel that constituted the present invention.

As shown, the rear frame extension 13 of the swather 10 extends to one side of the machine, although it might be directed to either side or to the center line of the apparatus. A wheel support bracket 14 is pivotally carried at the rear end of the extension 13, the bracket 14 having an integral forwardly extending shaft 15 rotatably journalled in the frame extension 13 for pivotal movement about a longitudinal axis parallel to the intended direction of movement of swather 10 relative to the supporting ground. The bracket 14 pivotally mounts a wheel support 16 about an upright axis that is perpendicular to and intersects the pivotal axis of shaft 15. The wheel support 16 rotatably carries a wheel 17 that is in ground contact, the rotational central axis of wheel 17 being located rearwardly of the upright axis of wheel support 16 on the bracket 14. This relationship between the various axes permits the bracket 14, the support 16 and the wheel 17 to pivot or rotate independently of one another and allows the wheel 17 to trail behind the swather 10 in a direction parallel to the movement of the swather 10 so as to permit turning of the apparatus.

At the forward end of shaft 15 is a crank arm 18 fixed to shaft 15 so as to turn integrally with it. The crank arm 18 extends radially outward from the longitudinal axis about which shaft 15 is mounted on the frame extension 13. A double acting hydraulic cylinder 20 is operatively connected between the frame extension 13 and the outer end of the crank arm 18. The cylinder 20 is anchored about a pivot axis on a bracket 22 fixed to the frame extension 13 and the extensible piston rod 21 is pivotally connected to the outer end of crank arm 18. The respective pivotal axes of cylinder 20 and piston rods 21 are both parallel to the longitudinal axis of shaft 15.

Cylinder 20 is preferably powered by the existing hydraulic machinery on the swather or apparatus 10. It is controlled by a conventional manual valve that can be operated by the operator of the machine in conjunction with the other controls monitored by him. The cylinder 20 might also be automatically controlled.

The purpose of this attachment is to permit the wheel 17 to be rotatably adjusted relative to the frame extension 13 so as to maintain it in a vertical position at all times, regardless of the hillside slope on which the machine is being operated. This is accomplished by adjustment of the effective length of the cylinder 20 and piston rod 21, using conventional hydraulic controls. As seen in FIGURE 6 and FIGURE 7, the wheel 17 can be pivoted to a vertical position regardless of which direction of slope is encountered by the machine. When used on level ground, wheel 17 can remain in its conventional vertical position as shown in FIGURE 3. The angular position of wheel 17 can be changed at any time to accommodate the hillside surface on which the machine must operate and to provide the steering stability required by a particular operator.

The wheel 17 could be automatically controlled from a pendulum or other type of conventional level control device used to operate the necessary valves to keep wheel 17 in a vertical position at any time. Such controls are well within the skill of one trained in this field and it is not believed that further discussion of the control details is necessary in order to understand this invention.

It is to be emphasized that the particular machine on which this attachment is illustrated is not intended to limit the application of this invention to any one type of apparatus. The instant attachment can be used on any type of machine or implement that is self-propelled and designed for use on a hillside. It also can be used on trailing implements to assist in stabilizing such devices so that they will not tend to drift downhill.

Having described my invention, I claim:

1. A stabilizing wheel apparatus for farm implements having a rigid mobile framework and forwardly positioned ground engaging wheels, comprising:
   a bracket pivotally mounted on the framework at the rear end thereof for rotational motion about a longitudinal axis parallel to the intended direction of movement of said framework relative to the ground;
   a wheel support pivotally mounted on said bracket for free pivotal motion about an upright axis perpendicular to an intersecting said longitudinal axis;
   a ground engaging wheel carried on said wheel support for rotation about a central transverse axis positioned rearwardly of said upright axis;
   means operatively connected between the framework and said bracket to selectively fix the angular position of said bracket relative to the framework about said longitudinal axis;
   said last-named means comprising:
   a radially extended crank arm fixed to said bracket;
   and an extensible hydraulic cylinder assembly pivotally connected at its respective ends to said crank arm at a location radially spaced from said longitudinal axis and to the framework, both connections being about axes parallel to said longitudinal axis.

2. A stabilizing wheel apparatus for farm implements having a rigid mobile framework and forwardly positioned ground engaging wheels, comprising:
   a bracket pivotally mounted on the framework at the rear end thereof for rotational motion about a longitudinal axis parallel to the intended direction of movement of said framework relative to the ground;
   a wheel support pivotally mounted on said bracket for free pivotal motion about an upright axis perpendicular to an intersecting said longitudinal axis;
   a ground engaging wheel carried on said wheel support for rotation about a central transverse axis positioned rearwardly of said upright axis;
   means operatively connected between the framework and said bracket to selectively fix the angular position of said bracket relative to the framework about said longitudinal axis;
   said bracket projecting rearwardly from the framework and further comprising:
   a forwardly protruding shaft rotatably journalled by the framework for motion about said longitudinal axis;
   a radially extended crank arm fixed to said bracket;
   and an extensible hydraulic cylinder assembly pivotally connected at its respective ends to said crank arm at a location radially spaced from said longitudinal axis and to the framework, both connections being about axes parallel to said longitudinal axis.

3. A stabilizing wheel apparatus for farm implements having a rigid mobile framework and forwardly positioned ground engaging wheels, comprising:
   a bracket pivotally mounted on the framework at the rear end thereof for rotational motion about a longitudinal axis parallel to the intended direction of movement of said framework relative to the ground;
   a wheel support pivotally mounted on said bracket for free pivotal motion about an upright axis perpendicular to an intersecting said longitudinal axis;
   a ground engaging wheel carried on said wheel support for rotation about a central transverse axis positioned rearwardly of said upright axis;
   and means operatively connected between the framework and said bracket to selectively fix the angular position of said bracket relative to the framework about said longitudinal axis;
   said ground engaging wheel being the only rear support element for the framework and wherein it is situated at one side of the framework; said bracket further comprising:
   a forwardly protruding shaft rotatably journalled by the framework for motion about said longitudinal axis;
   a radially extended crank arm fixed to said bracket;
   and an extensible hydraulic cylinder assembly pivotally connected at its respective ends to said crank arm at a location radially spaced from said longitudinal axis and to the framework, both connections being about axes parallel to said longitudinal axis.

References Cited by the Examiner
UNITED STATES PATENTS

| 2,370,355 | 2/1945 | Jones | 280—80 |
| 2,560,726 | 7/1951 | Jones et al. | 280—80 |
| 2,750,204 | 6/1956 | Ohrmann | 56—209 X |
| 2,918,300 | 12/1959 | Hendrickson | 280—80 |

KENNETH H. BETTS, *Primary Examiner.*